United States Patent [19]

Bell

[11] Patent Number: 5,194,534

[45] Date of Patent: Mar. 16, 1993

[54] TUNGSTEN-IMIDO CATALYSTS FOR RING-OPENING METATHESIS POLYMERIZATION OF CYCLOOLEFINS

[75] Inventor: Andrew Bell, West Grove, Pa.

[73] Assignee: Hercules Incorporated, Wilmington, Del.

[21] Appl. No.: 764,657

[22] Filed: Sep. 24, 1991

[51] Int. Cl.$^5$ .................. C08G 61/08; B01J 31/00
[52] U.S. Cl. .................. 526/161; 526/126; 526/139; 526/141; 526/142; 526/282; 526/283; 502/117; 502/121; 502/123; 502/125; 502/126; 502/158; 264/328.2; 264/328.6; 264/331.13
[58] Field of Search .............. 526/161, 283, 126, 139, 526/141, 142; 502/114, 117, 200, 121, 123, 125, 126, 158; 264/328.2, 328.6

[56] References Cited

U.S. PATENT DOCUMENTS 3,956,178 5/1976 Greco et al. .................. 526/161 X
4,727,215 2/1988 Schrock .................. 585/645

OTHER PUBLICATIONS

S. F. Pedersen et al, J. Am. Chem. Soc., 104, (1982) pp. 7483-7491.
H. T. Dodd et al, J. Molecular Catalysis, 15 (1982), pp. 103-110.
F. Quignard et al, J. Molecular Catalysis, 36 (1986), pp. 18-29.
R. R. Schrock et al, Macromolecules, 20 (1987), pp. 1172-1174.
J. S. Murdzek et al, Macromolecules, 20 (1987) pp. 2642-2644.
J. S. Murdzek et al, Organometallics, 6 (1987), pp. 1373-1374.
F. L. Klavetter et al, Poly. Pre. Am. Chem. Soc., Div. Poly. Chem., 28 (1987), pp. 425-426.
R. R. Schrock et al, J. Molecular Catalysis, 46 (1988) pp. 243-253.
J. P. LeNy et al, Organometallics, 10 (1991), pp. 1546-1550.

*Primary Examiner*—Fred Teskin
*Attorney, Agent, or Firm*—Marion C. Staves; Joanne W. Patterson

[57] ABSTRACT

This invention relates to a two component catalyst system for the polymerization of metathesis polymerizable cycloolefins, comprising (a) a pure tungsten-imido compound (procatalyst) of the formula

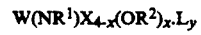

$$W(NR^1)X_{4-x}(OR^2)_x \cdot L_y$$

wherein $x=0, 1, 2, 3$ or $4$; $y=0$ or $1$; $R^1$ and $R^2$ are alkyl, phenyl, phenyl-substituted phenyl, phenylalkyl or halogen substituted derivatives of alkyl, phenyl, phenyl-substituted phenyl or phenylalkyl; $X=Br$ or $Cl$; where alkyl has 1 to 8 carbon atoms, phenyl-substituted phenyl has 12-18 carbon atoms and phenylalkyl has 7 to 20 carbon atoms; L is a donor ligand; and (b) an activator compound selected from organometals and organometal hydrides with tri-n-butyltin hydride and tri-octyltin hydride the most preferred. This invention also relates to a process for preparing thermoset molded articles possessing low levels of residual monomer using a ring-opening metathesis polymerization by reaction injection molding using the two component catalyst system of this invention and the polymer prepared by this process.

24 Claims, No Drawings

TUNGSTEN-IMIDO CATALYSTS FOR RING-OPENING METATHESIS POLYMERIZATION OF CYCLOOLEFINS

FIELD OF INVENTION

This invention is a process for the bulk polymerization of metathesis polymerizable cycloolefins, especially dicyclopentadiene, the polymer prepared by this process and the catalyst system used in the process.

BACKGROUND OF THE INVENTION

Preparation of thermoset cycloolefin polymers via metathesis catatysis is a relatively recent development in the polymer art. Klosiewicz, in U.S. Pat. Nos. 4,400,340 and 4,520,181, teaches preparation of such polymers from dicyclopentadiene and other similar cycloolefins via a two-stream reaction injection molding (RIM) technique wherein a first stream, including the catalyst, and a second stream, including a catalyst activator, are combined in a mixhead and immediately injected into a mold where, within a matter of seconds, polymerization and molding to a permanently fixed shape takes place simultaneously. The thermoset polymers produced have physical properties making them suitable for structural and electronic applications. In such RIM processes, it is important that the polymerization reaction occur rapidly and with as complete incorporation of the charged monomers as possible. It has been found that in molding polydicyclopentadiene, for example, that the presence of unreacted monomer results in a molded part of a very unpleasant odor and less than optimum physical properties. In commercial RIM processes, it is also economically desirable that the process be carried out in as short a cycle time as possible.

In the typical system, according to Klosiewciz, the catalyst component is a tungsten or molybdenum halide and the activator is an alkyl aluminum compound. Most strained ring non-conjugated polycycloolefins are metathesis polymerizable. The preferred cyclic monomer is dicyclopentadiene or a mixture of dicyclopentadiene with other strained ring hydrocarbons.

The preferred catalyst component as taught by Klosiewicz is a tungsten halide, and preferably a mixture or complex of tungsten hexachloride ($WCl_6$) and tungsten oxytetrachloride ($WOCl_4$). The tungsten or molybdenum compound of Klosiewciz is not normally soluble in the cycloolefin, but can be solubilized by complexing it with a phenolic compound.

In U.S. Pat. Nos. 4,981,931 and 5,019,544 tungsten catalyst compositions for metathesis polymerization comprising:

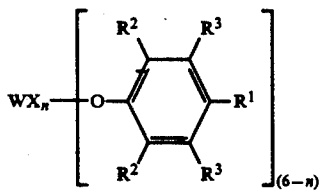

where X is Cl or Br, n is 2 or 3, $R^1$ is H, Cl, an alkyl group having 1–10 carbons, an alkoxy group having 1 to 8 carbons, or a phenyl group, $R^2$ is H or an alkyl group having 1 to 9 carbon atoms and $R^3$ is H or an alkyl group having 1 to 10 carbon atoms for use with tri-n-butyltin hydride or a triphenyltin hydride activator, are disclosed. Both the catalyst and activator compounds are disclosed to have improved stability with resistance to oxygen and moisture. It is indicated the catalyst compounds are easy to isolate instead of being mixtures as those found in the prior art.

More recently, U.S. Pat. No. 5,082,909 discloses a process for preparing a polymer which comprises contacting a strained ring polycyclic polyolefin with a substantially pure tungsten complex, having the formula $WOCl_{4-x}(OAr)_x$, wherein OAr represents a mono, di, tri, tetra or penta-substituted phenoxy group and where $x=1, 2,$ or 3. These catalysts are indicated to be efficient in promoting ring-opening metathesis polymerization of dicyclopentadiene (DCPD) at lower catalyst concentration levels than previously achieved.

Recent publications have disclosed that tungsten and molybdenum imido-alkylidene complexes, e.g., $M(NAr)(CHR)(OR)_2$ (=Mo or W), can be used for ring-opening metathesis catalysis resulting in the preparation of linear polymers and polyacetylenes. In these cases, the $M(NAr)(CHR)(OR)_2$ species are regarded as very active unicomponent ROMP catalysts. Schrock et al in J. Am Chem. Soc. 110, 1423 (1988) describe a number of tungsten complexes of the stoichiometry $W(OR')_2(=CHR'')(NAr')$, where OR' is selected from alkoxide (e.g., $OCMe_3$), thiophenylalkyl (e.g., $SC_6H_3$-2,6-i-$Pr_2$), phenoxide (e.g., $OC_6H_2$-2,6-i-$Pr_2$) fluoroalkoxide (e.g., $OC(CF_3)_3$), and Ar' is a substituted aromatic ring, such as 2,6-diisopropylphenyl or 2,6-dimethylphenyl. A number of methods have been previously disclosed for the preparation of tungsten-imido-alkylidene complexes. However, all of these methods provided for separate preparation of such alkylidene complexes prior to addition to the monomer. For example, the original preparation of $W(CHC(CH_3)_3)(NAr)(OC(CH_3)_2$ (where Ar=2,6-diisopropylphenyl) was achieved by reacting $W(CHC(CH_3)_3)(NAr)(dme)Cl_2$ (where dme is dimethoxyethane) with two equivalents of lithium tert-butoxide. The $W(CHC(CH_3)_3)(NAr)(dme)Cl_2$ was prepared by a five step reaction as described by Schaverian et al. in the Journal of the American Chemical Society, 1986, 108, 2771–2773. The reaction involved the reaction of three equivalents of $CH_3O$-$Si(CH_3)_3$ with $WCl_6$ to produce $W(OCH_3)_3Cl_3$. $W(OCH_3)_3Cl$, was then reacted with six equivalents of $(CH_3CCH_3)MgCl$ in ether to produce $W(CC(CH_3)_3)(CH_2CCH_3)_3$. $W(CC(CH_3)_3)(CH_2CCH_3))_3$ was in turn reacted with three equivalents of HCl in dimethoxymethane to achieve $W(CC(CH_3)_3)(dme)Cl_3$. This last product was reacted with trimethylsilyl-2,6-diisopropylphenylamine(ArNHTMS) to produce $W(CHC(CH_3)_3)(NHAr)(dme)Cl_2$. The final step in the sequence is completed by the reaction of $W(CHC(CH_3)_3)(NHAr)(dme)Cl_2$ with $(CH_3CH_2)_3N$ in ether to produce the desired product of $W(CHC(CH_3)_3)(NAr)(dme)Cl_2$. The most recent synthetic strategies have been outlined by Schrock et al. in Organometallics, 1990, 9, 2262–2275. There are other routes available for the preparation of tungsten-imido alkylidene complexes (L. K. Johnson; S. C. Virgil; R. H. Grubbs; J. W. Ziller. J. Am. Chem. Soc. 1990, 112, 5384–5385.), but they also require the use of severe chemicals and laborious multi-step preparations.

As indicated above, the previous reaction schemes involve the preparation of complexes as a process separate from the polymerization process. In addition, the previous complexes have not been used for polymer synthesis where a two (or more) component system, such as in reaction injection molding (RIM) is used.

SUMMARY OF THE INVENTION

It has now been found that tungsten-imido alkylidenes can be prepared in situ to provide a catalyst composition that polymerizes strained ring polycyclic olefins to very low levels of residual monomer. The process comprises contacting a strained ring polycyclic olefin with (a) a substantially pure tungsten complex, having the general formula:

where x=0, 1, 2, 3 or 4; y=0 or 1; $R^1$ and $R^2$ are selected from alkyl, phenyl, phenyl substituted phenyl, phenylalkyl or halogen substituted derivatives of alkyl, phenyl, phenyl substituted phenyl or phenylalkyl; X=Br or Cl; L is a donor ligand; said alkyl contains 1 to 8 carbon atoms, phenyl substituted phenyl contains 12 to 18 carbon atoms and phenylalkyl 7 to 20 carbon atoms; and (b) an activator compound selected from organometals and organometal hydrides.

DETAILED DESCRIPTION OF THE INVENTION

In accordance with this invention, it has been found that methathesis polymerizable strained non-conjugated polycyclic olefins such as dicyclopentadiene (DCPD), trimers of cyclopentadiene, higher order cyclopentadiene oligomers, norbornene, norbornadiene, 4-alkylidene norbornenes, dimethanohexahydronaphthalene, dimethanooctahydronaphthalene, and alkyl substituted derivatives of said cycloolefins and mixtures thereof can be polymerized to high polymer yield in bulk by employing tungsten-imido procatalyst complexes of the general formula:

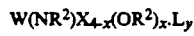

wherein x=0, 1, 2, 3 or 4; y=0 or 1; $R^1$ and $R^2$ are alkyl, phenyl, phenyl substituted phenyl, phenylalkyl or halogen-substituted derivatives of alkyl, phenyl, phenyl substituted phenyl or phenylalkyl; X=Br or Cl; L=a donor ligand; said alkyl contains 1 to 8 carbons, phenyl substituted phenyl 12 to 18 carbons and phenylalkyl 7 to 20 carbons. These compounds are suitable procatalysts for the ring-opening metathesis polymerization of strained cycloolefins in bulk. In a similar fashion, these procatalysts may also be employed in the solution polymerization of strained cycloolefins. The preferred cyclic monomer is dicyclopentadiene (DCPD) or a mixture of dicyclopentadiene with other strained ring hydrocarbons in ratios of 1 to 99 mole % of either monomer, preferably about 75 to 99 mole % dicyclopentadiene.

Typical examples of alkyl groups employed in the catalyst of this invention are methyl, ethyl, isopropyl, hexyl, tert.butyl, tert.octyl, etc. Typical examples of phenyl substituted phenyl groups employed in the catalyst of this invention are 2,6-diphenyl phenylene, 2-phenyl phenylene, etc. Typical examples of phenyl alkyl groups employed in the catalyst of this invention are tolyl, benzyl, triphenyl methyl, 2,6-diheptylphenyl, 2,6-diisopropylphenyl, 2,4,6-trimethylphenyl, 2,6-di-tert butylphenyl, etc. Typical examples of halogen substituted derivatives of alkyl groups employed in the catalyst of this invention are trifluoro-tert-butyl (i.e., $(CF_3(CH_3)_2C)$, hexabromo-tert-butyl (i.e. $(CBr_3)_2(CH_3C)$, perfluoro-tert-butyl, trichloromethyl, hexachloro isopropyl (i.e. $(CCl_3)_2C$). Typical examples of halogen substituted phenyl groups employed in the catalyst of this invention are pentafluorophenyl, 2,6-dichlorophenyl, 2,6-dibromophenyl, 4-iodophenyl, etc. Typical examples of halogen substituted phenyl substituted phenyl groups employed in the catalyst of this invention are 2,6-di-(6-chlorophenyl)phenylene, 2,7-di(2,6-difluorophenyl)phenylene, etc. Typical examples of halogen substituted phenylalkyl groups employed in the catalyst of this invention are bis trifluoromethyltrifluoromethyl tolyl, 4-chloro-2,6-dimethylphenyl, 2,6-di(tribromomethyl)phenyl, etc. Typical donor ligands employed in the catalyst of this invention are diethyl ether, ethylene glycol dimethyl ether, triethylene glycol dimethyl ether, 2-methoxyethyl ether, tetraethylene glycol dimethyl ether, tetrahydrofuran, acetonitrile, benzonitrile, pyridine, pyrazine and quinuclidine.

The phenyl ring in the above catalyst formula may be mono-substituted at the 2, 3, or 4 positions. In the disubstituted phenyl ring the substituents may be at the 2,6; 2,5; 2,4; or 2,3 positions or at the 3,4; 3,5; or 3,6 positions. The substituents may be the same or different groups. In the trisubstituted phenyl ring, substituents may be at the 2,3,5; 2,3,4; 2,3,6; 3,4,5; and 2,4,5 positions, and the substituents may be the same or different groups. The two tetra-substituted structures for the phenyl ring have substituents at the 2,3,4,5 or the 2,3,4,6 positions, where the substituents may be the same or different.

Various activator compounds may be employed to act together with the tungsten catalyst complexes described above to cause the polymerization of strained ring polycyclic cycloolefins. Mixtures of two or more activator compounds may produce more desirable polymerization conditions and more desirable polymer properties than a single activator compound in certain situations. However, a single activator compound is sufficient. Suitable activator compounds that can be employed in the practice of this invention include, for example, trialkylaluminums, dialkylaluminum halides, alkylaluminum dihalides, dialkyl(alkoxy)aluminums, alkyl(alkoxy)aluminum halides, dialkylzines, diarylzincs, alkylsilanes ($RSiH_3$, $R_2SiH_2$, and $R_3SiH$), tetraalkyltins, trialkyltin hydrides, dialkyltin dihydrides, and triaryltin hydrides. Specific examples of activators include: ethylaluminum dichloride, diethylaluminum chloride, triethylaluminum, diethylzinc, dibutylzinc, ethyl-n-propoxyaluminum chloride, diphenylzinc, tri-n-butyltin hydride, trioctyltin hydride, diphenylthin dihydride, and triphenyltin hydride. The tin activators are preferred. Among the trialkyltin hydrides, suitable for use in the process of the invention, tri-n-butyltin hydride and trioctyltin hydride are most preferred.

The dicyclopentadiene monomer used herein is preferably of high purity, i.e., containing less than 2% impurities. Other monomers or comonomers employed in the practice of this invention should be about this degree of purity. It is also contemplated, however, that the polymerization feed compositions of this invention can polymerize less pure grades of dicyclopentadiene when the appropriate tungsten catalyst compound, activator compound and other components are employed.

When the two parts of the catalyst system (i.e., the tungsten and the activator) are combined, the resulting cycloolefin (for example, DCPD) to catalyst compound ratio will be from about 500:1 to 15,000:1 on a molar basis, preferably 2000:1, and the molar ratio of the tungsten complex versus the activator ratio will be from about 1:1 to 1:8. Generally, the polymerization takes place in bulk, but the catalyst components may be dissolved in a small amount of solvent, such as toluene. It is preferred, however, to use DCPD as a solvent. When liquid tri-n-butyltin hydride is used as the activator compound, no solvent is necessary for the addition since tri-n-butyltin hydride is readily soluble in DCPD. A preferred method in the practice of this invention for the polymerization of DCPD is to contact a tungsten compound, i.e., the "catalyst component," with the "activator component" stream, wherein at least one of the streams contains the monomer. For example, it is possible to dissolve the tungsten procatalyst in DCPD and either to dissolve the activator in DCPD or in another solvent or to use the activator without any solvent. Usually both the tungsten catalyst and the activator are first dissolved in separate streams of DCPD prior to the mixture of said streams. After the streams have contacted with each other the resulting mixture may be poured or injected into a mold, where the polymerization takes place. The polymerization is exothermic, but heating the mold to about 50° to 100° C., is preferred. The tungsten procatalyst may be stored in DCPD for some time provided that the DCPD contains only a few ppm of water or less. The activator compounds, e.g., trialkyltin hydride, are storable in DCPD for prolonged periods and tolerate relatively higher levels of water than the catalysts without losing their reactivity.

Stabilizes may be necessary, when the monomer and tungsten catalyst are to be stored together for prolonged periods of time with the monomer and activator combination stored separately. In order to maintain the stability of tungsten compounds in high purity DCPD and aid in their solubility, it has been shown that the addition of stabilizing or solubilizing compounds to the solutions may be necessary. The addition of a stabilizer is not an absolute requirement of the practice of the invention. Typical stabilizer compounds include Lewis bases such as diethyl ether, ethylene glycol dimethyl ether, 2-methoxy ethyl ether, triethylene glycol dimethyl ether, tetraethylene glycol dimethyl ether, benzonitrile, acetonitrile, tetrahydrofuran, monophenols such as 2,6-di-tert-butyl-4-methylphenyl, 2,6-di-tert-butyl-4-sec-butylphenol) bisphenols such as 2,2'-methylenebis(4-methyl-6-butylphenyl), 2,2'-methylenebis(4-ethyl-6-butylphenol); 4,4'-methylenebis(2,6-di-tert-butylphenol); 2,2'-ethylenebis(4,6-di-tert-butylphenol); 2,2'-methylenebis(4-ethyl-6-(1-methylenebis(4-ethyl-6-(1-methylcyclohexyl)-phenyl); 4,4'-butylidenebis(6-tert-butyl-3-methylphenyl); 4,4'-thiobis(6-tert-butyl-3-methylphenyl); 4,4'-methylenebis(2,6-dimethylphenol); 1,1'-thiobis(2-naphthol); 2,2'-thiobis(4-methyl-6-tert-butylphenol); - 2,2'-isobutylidenebis(4,6-dimethylphenol); 2,2'-methylenebis(4-methyl-6-cyclohexyl)-phenol); polyphenols such as 1,3,5-trimethyl- 2,4,6-tri(3,5-di-tert-butyl-4-hydroxybenzyl)-benzene; butylated reaction product of p-cresol and dicyclopentadiene. In addition, mixtures of the above stabilizer compounds such as a mixture of 2-methoxyethyl ether and one or more phenols can be employed in the practice of this invention.

A rate moderator can also be added to the tungsten or activator compounds. The rate moderator compound prevents the polymerization process from being too rapid, provides for adequate mixing of the catalyst components, and allows the mold to be completely filled. The rate moderator compounds useful in this invention include the various nitrogen or phosphorus compounds used for this purpose as described in U.S. Pat. Nos. 4,727,125; 4,883,849, and 4,933,402 which are incorporated herein by reference. Preferred rate moderators include pyridine; pyrazine; tributylphosphite ((BuO)$_3$P); triethylphosphine (PEt$_3$); tributylphosphine (PBu$_3$); tricyclohexylphosphine (PCy$_3$); triphenylphosphine (PPh$_3$); methyldiphenylphosphine (PMePh$_2$); dimethylphenylphosphine (PMe$_2$Ph); triethylphosphite (P(OEt)$_3$); triisopropylphosphite (P(O-i-Pr)$_3$); ethyldiphenylphosphonite (P(OEt)Ph$_2$): triphenylphosphite OP(OPh)$_3$); triisopropylophosphine (P-i-Pr$_3$); trimethylphosphite (P(OMe)$_3$); tri-tert-butylphosphine (P-tert-Bu$_3$); diethylphenylphosphonite (P(OEt)$_2$Ph); and tribenzylphosphine (P(CH$_2$Ph)$_3$). The stabilizer and rate moderators may not be necessary when lower purity dicyclopentadiene monomer is employed. Various optional components can be present in the reaction mixture during polymerization. Additives such as solvents, elastomers, blowing-agents, fillers, pigments, antioxidants, light stabilizers, plasticizers, foaming agents, reinforcing agents, and polymeric modifiers can be added to obtain desired properties. In some embodiments of this invention, a preformed elastomer which is soluble in the reactant streams is added to the metathesis-catalyst system in order to increase the impact strength of the polymer. The elastomer is dissolved in either or both of the reactant streams in an amount from about 3 to about 15 weight percent range, based on the weight of monomer. Illustrative elastomers include natural rubber, butyl rubber, polyisoprene, polybutadiene, polyisobutylene, ethylene-propylene copolymer, styrene-butadiene-styrene triblock rubber, random styrene-butadiene rubber, styrene-isoprene-styrene triblock rubber, ethylene-propylene-diene terpolymers, ethylene-vinyl acetate and nitrile rubbers. Various polar elastomers can also be employed. The amount of elastomer used is determined by its molecular weight and is limited by the viscosity of the resultant reactant streams. The streams containing elastomer cannot be so viscous that mixing is not possible. Although the elastomer can be dissolved in either one or both of the streams, it is desirable that it be dissolved in both. These components are most conveniently added to the reaction as constituents of one or more of the reaction mixture streams, as liquids or as solutions in the monomer.

The best mode now contemplated of carrying out this invention will be illustrated with the following examples. The examples are given for the purpose of illustration only and the invention is not to be regarded as limited to any of the specific materials or conditions used in the examples.

In the following examples, some of the tungsten complex catalyst components are prepared utilizing tungsten oxytetrachloride (WOCl$_4$) obtained commercially. In some preparations the WOCl$_4$ was prepared by reacting tungsten hexachloride (WCl$_6$) with hexamethyldisiloxane (Me$_3$SIOSiMe$_3$) in the following manner. A solution of hexamethyldisiloxane (HMDS) (10.72 mL, 0.0483 moles) is dissolved in toluene (50 mL) and placed in a glass column fitted with a septum and a stopcock to which a needle is attached. This solution is added dropwise into a toluene (250 mL) solution of WCl$_6$ (20 grams, 0.0504 mol) while stirring in a 500 mL round bottomed flask. After the addition is completed the column is removed and the reaction mixture allowed to stir overnight under nitrogen. The brown solution is filtered in the dry box to yield a quantity of crude, orange $WOCl_4$ (14.6 g; 84% yield). The crude material is sublimed under reduced pressure at 100° C. in three stages to give bright orange crystalline $WOCl_4$ (13.7 g; yield 79%). In those examples where phenyl isocyanate and 2,6-diisopropylphenyl isocyanate are employed they are first dried over 4A molecular sieves and purged with nitrogen prior to use. Where used, 2-methyoxyethyl ether and/or rate moderates, such as tributylphosphite are also dried over the appropriate molecular sieves and sparged with dry nitrogen prior to use.

All operations are carried out under a dry nitrogen atmosphere or in vacuum either in a Vacuum Atmospheres Dri-Lab (inerted by argon gas) or other known techniques. All solvent transfers must be performed by cannula or syringe techniques to maintain an inert atmosphere.

In the Examples in which polymerization studies are set forth, the following general procedures are followed. All manipulations are performed anaerobically in nitrogen-sparged pop bottles or under an argon atmosphere (Vacuum Atmospheres Dri-Lab) or using other known techniques. Tri-n-butyltin hydride (packaged in Sure/Seal Bottle) is stored refrigerated (0° C.). Triethylaluminum, ($Et_3Al$, 1.9 M in toluene), diethylaluminum chloride ($Et_2AlCl$) (1.8 M in toluene), and diethylzinc ($Et_2Zn$, 1.1 M in toluene) are used as received. Dicyclopentadiene (DCPD) (98-99%) is sued to prepare all catalyst and activator polymerization stock solutions. All liquid transfers are made by either syringe or cannulae.

Polymerizations are conducted in nitrogen-sparged test tubes by adding together the catalyst and activator components (2.5 mL of each), mixing on a vortex mixer and then inserting the tube into an oil bath at 80°0 C. or higher or into a heated block to about 30° C. Gel times ($t_{gel}$) are estimated by observing the initial viscosity from the time of mixing the catalyst and activator solutions containing DCPD until formation of a gel. Similarly, the time from mixture of the solutions until the temperature reached 100° C. (above ambient temperature) or 180° C. (above the 80° C. bath temperature) is noted and recorded as the induction time or cure time.

In addition to measuring gel and cure times and residual monomer level, a measurement of swell value is made. The swell value is an indication of the degree of crosslinking in the polymer, i.e., lower swell values indicate a higher degree of crosslinking. The general procedure used for swell value determinations is as follows: A 5 gram sample of polymer is removed from its test tube (by breaking the glass) and carefully sliced into 1-2 mm thick sections across the cylindrical axis. The burrs are removed, and each slice weighed to the nearest milligram. This is done for each sample at a given monomer feed. The samples are then placed in a volume of toluene (50 mL of toluene for each gram of polymer), heated to reflux for 16 hours (overnight) and cooled. After this time, each sample is removed from the flask and placed in a small dish of fresh toluene. The slices are removed, patted dry, and weighed individually, taking care not to tear the swollen samples. The swell values are calculated using the following formula: swell $(\%)=(W_2-W_1)/W_1 \times 100\%$, where $W_1$=initial weight of the polyDCPD sample and $W_2$=weight of solvent swollen polyDCPD sample. Since the swell value is an indication of the degree of crosslinking in the polymer, low values are preferred.

EXAMPLE 1

Preparation of Tungsten Procatalyst

A catalyst composition having the formula $W(NPh)Cl_4O(CH_2CH_3)_2$ (where "Ph" is phenyl) is prepared in the following manner. A quantity of $WOCl_4$(5. g; $1.46 \times 10^{-2}$ moles) is placed into a 250 mL round bottomed flask together with a magnetic stir bar. To the tungsten oxytetrachloride is added octane (100 mL) and phenyl isocyanate (1.6 mL; $1.47 \times 10^{-2}$ moles. This reaction mixture is stirred while refluxing for a number of hours under reflux. The flask is taken into the dry box where the solids are obtained by filtration and washed with a small quantity of pentane. The green powder obtained is dissolved in a minimum of diethyl ether (70 mL). The green colored solution is filtered and the resultant filtrate is kept. Removal of the solvent from the ether solution results in the deposition of large dark green blocks. To this material is added 10 mL diethyl ether so that the compound can be recovered from the flask. The solids collected by filtration are filtered and dried for a short time in vacuo. Total yield of $W(NPh)Cl_4O(CH_2CH_3)_2$ is 5.81 grams (81%).

EXAMPLE 2

Preparation of Tungsten Procatalyst

A catalyst composition having the formula $W(NPh)(OC(CH_3)_3)_4$ is prepared in the following manner. A quantity of $W(NPh)(Cl_4O(CH_2CH_3)_2$ (3.17 g; $6.46 \times 10-3$ moles), prepared in accordance with Example 1, is placed into a 250 mL round bottomed flask containing a magnetic stir bar and the vessel is then stopped. Diethyl ether (100 mL) is added to the $W(NPh)Cl_4O(CH_2CH_3)_2$ by cannula and the green solution cooled to 0° C. in an acetone-ice bath. A quantity of lithium tert-butoxide (2.07 g; $25.9 \times 10-3$ mol) is placed into a reaction vessel and dissolved in 100 mL of diethyl ether. The lithium tert-butoxide-diethyl ether solution is slowly cannulated into the reaction flask containing the tungsten-imido compound and the solution immediately turns pale yellow. After stirring the mixture overnight another 100 mL of diethyl ether are added to the reaction flask and the solution stirred for a short period of time to ensure all the desired compound is dissolved. The lithium chloride salt formed in the reaction is allowed to settle from solution, and the supernatant yellow liquid cannulated into another vessel. Removal of the diethyl ether yields the primrose yellow complex, $W(NPh)(OC(CH_3)_3)_4$. The remaining salts are taken into the dry box and washed with pentane (100 mL). This solution is filtered and the pale yellow filtrate obtained evaporated under reduced pressure to give a yellow solid. The two yellow solids obtained are combined, stirred with 30 mL of pentane, and filtered. The filtrate is transferred to a small round bottomed flask and sparged to dryness. The yield of $W(NPh)(OC(CH_3)_3)_4$ is 3.50 grams (96%).

EXAMPLE 3

Polymerizations

In this example mixtures of catalyst and activator are prepared using the tungsten compound of Example 1 with diethylaluminum chloride. Stock solutions of $W(NPh)(Cl_4O(CH_2CH_3)_2$ in DCPD are prepared at a ratio of 1000:1 (100 mL:0.357 g), $W(NPh)Cl_4O(CH_2CH_3)_2$. The ratio DCPD:diethylaluminum chloride is 1000:3 (50 mL:1.22 mL of a 1.9 M $(CH_3CH_2)_2AlCl$ solution in toluene). Each of the above components is prepared by charging a 10 oz pop bottle. The final reaction ratio for mixed catalyst and activator components is 2000:1:3 (DCPD:W:activator). Test tube polymerizations are performed by mixing 2.5 mL of each component and maintaining the temperature at room temperature or placing the test tube directly into an oil bath. Pertinent details from the DCPD polymerizations employing $W(NPh)Cl_4O(CH_2CH_3)_2/(CH_3CH_2)AlCl$ are as follows: At 30° C., $t_{gel}=5$ seconds; $t_{100°\ C.}=28$ seconds; $t_{cure}=33$ seconds; $T_{max}=147°$ C. At 80° C., $t_{gel}=5$ seconds; $t_{cure}=29$ seconds; $T_{max}=142°$ C; swell (%)=74.6; residual DCPD (%)=18.4.

EXAMPLE 4

Polymerizations

In this example mixtures of catalyst and activator are prepared using the tungsten compound of Example 1 with tri-n-butyltin hydride. Stock solutions of $W(NPh)Cl_4O(CH_2CH_3)_2$ in DCPD are prepared at a ratio of 1000:1 (100 mL:0.357 g), $DCPD:W(NPh)Cl_4O(CH_2CH_3)_2$. The ratio of DCPD:tri-n-butyltin hydride $((CH_3CH_2CH_2CH_2)_3SnH)$ is 1000:3 (50 mL:0.59 mL). Each of the above components is prepared by charging a 10 oz pop bottle. The final reaction ratio for mixed catalyst and activator components is 2000:1:3 (DCPD:W:activator). Test tube polymerizations are preformed by mixing 2.5 mL of each component and maintaining the temperature at room temperature or placing the test tube directly into an oil bath. Pertinent details from the DCPD polymerizations employing $W(NPh)Cl_4O(CH_2CH_3)_2/(CH_3CH_2CH_2CH_2)_3SnH$ are as follows: At 30° C., $t_{gel}=1$ second; $t_{100°\ C.}=4$ seconds; $t_{cure}=25$ seconds; $T_{max}=198°$ C.

EXAMPLE 5

Polymerizations

In this example, mixture of catalyst and activator are prepared using the tungsten compound of Example 1 with tri-n-butyltin hydride and tributylphosphite (TBP) as the rate moderator. Stock solutions of $W(NPh)Cl_4O(CH_2CH_3)_2$ in DCPD are prepared at a ratio of 1000:1 (100 mL:0.357 g), $DPCD:W(NPh)Cl_4O(CH_2CH_3)_2$. The ratio of DCPD:tri-n-butyltin hydride:tributylphosphite is 1000:3:3 (50 mL:0.59 mL:0.60 mL). Each of the above components is prepared by charging a 10 oz. pop bottle. The final reaction ratio for mixed catalyst and activator components is 2000:1:3:3 (DCPD:W:activator:TBP). Test tube polymerizations are performed by mixing 2.5 mL of each component and maintaining the temperature at room temperature or placing the test tube directly into an oil bath. Pertinent details from the DCPD polymerizations employing $W(NPh)Cl_4O(CH_2CH_3)_2/(CH_3CH_2CH_2CH_2)_3SnH/TBP$ are as follows: At 30° C., $t_{gel}=30$ seconds; $t_{100°\ C.}=125$ 1 seconds; $t_{cure}=154$ seconds; $T_{max}=196°$ C.; swell (%)=151.7; residual DCPD (%)=1.02. At 80° C., $t_{gel}=14$ seconds; $t_{100°\ C.}=23$ seconds; $t_{cure}=49$ seconds; $T_{max}=210°$ C.; swell (%) =140.3; residual DCPD (%)=3.23.

EXAMPLE 6

Polymerizations

In this example, mixtures of catalyst and activator are prepared using the tungsten compound of Example 2 with diethylaluminum chloride. Stock solutions of $W(NPh)(OC(CH_3)_3)_4$ in DCPD are prepared at a ratio of 1000:1 (100 mL:0.357 g), $DCPD:W(NPh)(OC(CH_3)_3)_4$. The ratio of DCPD:diethylaluminum chloride is 1000:3 (50 mL:1.22 mL). The above components are prepared by charging a 10 oz. pop bottle. The final reaction ratio for mixed catalyst and activator components is 2000:1;3 (DCPD:W:activator). Test tube polymerizations are performed by mixing 2.5 mL of each component and maintaining the temperature at room temperature or placing the test tube directly into an oil bath. The pertinent information for the polymerizations of $W(NPh)(OC(CH_3)_3)_4/(CH_3CH_2)_2AlCl$ is shown in the following details. At 30° C., $t_{gel}=6$ seconds; $t_{100°\ C.}=23$ seconds; $T_{180°\ C.}=29$ seconds; $t_{cure}=44$ seconds; $T_{max}=202°$ C.; swell (%)−157.5; residual DCPD (%)=0.38. At 80° C. $t_{gel}=4$ seconds; $t_{100°\ C.}=19$ seconds; $t_{180°\ C.}=23$ seconds; $t_{cure}=39$ seconds; $T_{max}=210°$ C.; swell (%)=194.4; residual DCPD (%)=0.41.

EXAMPLE 7

Polymerizations

In this example, mixtures of catalyst and activator are prepared using the tungsten compound of Example 2 with diethylaluminum chloride and 2,6-dimethylpyridine rate moderator. Stock solutions of $W(NPh)(OC(CH_3)_3)_4$ in DCPD are prepared at a ratio of 1000:1 (100 mL:0.357 g), $DCPD:W(NPh)(OC(CH_3)_3)_4$. The ratio of DCPD:diethylaluminum chloride:2,6-dimethylpyridine is 1000:3:3 (50 mL:1.22 mL:0.26 mL). The above components are prepared by charging a 10 oz. pop bottle. The final reaction ratio for mixed catalyst and activator components is 2000:1:3:3 (DCPD:W:activator:rate moderator). Test tube polymerizations are performed by mixing 2.5 mL of each component and maintaining the temperature at room temperature or placing the test tube directly into an oil bath. The pertinent information for the polymerizations of $W(NPh)(OC(CH_3)_3)_4/(CH_3CH_2)_2AlCl/2,6$-dimethylpyridine is shown in the following details. At 30° C., $t_{gel}=3$ seconds; $t_{100°\ C.}=65$ seconds; $t_{180°\ C.}=116$ seconds; $t_{cure}=129$ seconds; $T_{max}=191°$ C.; swell (%)=213.2; residual DCPD (%)=0.61. At 80° C., $t_{gel}=3$ seconds; $t_{100°\ C.}=52$ seconds; $t_{180°\ C.}=56$ seconds; $t_{cure}=69$ seconds; $T_{max}=215°$ C.; swell (%)=206.9; residual DCPD (%)=0.94.

EXAMPLE 8

Polymerizations

In this example, mixtures of catalyst and activator are prepared using the tungsten component of Example 2 with diethylaluminum chloride. Stock solutions of $W(NPh)(OC(CH_3)_3)_4$ in DCPD are prepared at a ratio of 1000:1 (100 mL:0.357 g), $DCPD:W(NPh)(OC(CH_3)_3)_4$. The ratio of DCPD:diethylaluminum chloride:tributylphosphite (TBP) is 1000:3:3 (50 mL:1.22 mL:0.60 mL). the above components are prepared by charging a 10 oz. pop bottle. The final reaction ratio for mixed catalyst and activator components is 2000:1:3:3 (DCPD:W:activator:rate moderator). Test tube polymerizations are performed by mixing 2.5 mL of each component and maintaining the temperature at room temperature or placing the test tube directly into an oil bath. The pertinent information for the polymerizations of W(NPh)(OC(CH$_3$)$_3$)$_4$/(CH$_3$CH$_2$)$_2$Al/TBP is shown in the following details: At 30° C., $t_{gel}$=95 seconds; $t_{100°\ C.}$=266 seconds; $t_{180°\ C.}$=306 seconds; $t_{cure}$=295 seconds; $T_{max}$=188° C.; swell (%)=184.8; residual DCPD (%)=0.69. At 80° C., $t_{gel}$=21 seconds; $t_{100°\ C.}$=45 seconds; $t_{180°\ C.}$=49 seconds; $t_{cure}$=63 seconds; $T_{max}$=215° C.; swell (%)=177.3; residual DCPD (%)=1.06.

EXAMPLE 9

Preparation of Tungsten Procatalyst

The compound W(NPh)Cl$_2$(OC$_6$H$_3$—2,-6—((CH$_3$)$_2$CH)$_2$ is prepared in a manner similar to the method of Examples 1 and 2. W(NPh)Cl$_4$O(CH$_3$CH$_2$)$_2$ is allowed to react with the prerequisite amount of lithium 2,6-diisopropylphenoxide (LiOC$_6$H$_3$—2,-6—((CH$_3$)$_2$CH)$_2$ in diethyl ether.

EXAMPLE 10

Preparation of Tungsten Procatalyst

The compound W(NPh)(OC$_6$H$_3$—2,6—Cl$_2$)$_2$Cl$_2$ is prepared in a manner similar to the method of Examples 1 and 2. W(NPh)Cl$_4$O(CH$_3$CH$_2$)$_2$ is allowed to react with the prerequisite amount of lithium 2,6-diisopropylphenoxide (LiOC$_6$H$_3$—2,6—((CH$_3$)$_2$CH)$_2$ in diethyl ether.

EXAMPLE 11

Preparation of Tungsten Procatalyst

The compound W(NC$_6$H$_3$—2—6—((CH$_3$)$_2$(OC(CH$_3$)$_3$)$_2$Cl.tetrahydrofuran is prepared in a manner similar to the method of Examples 1 and 2. W(NPh)Cl$_4$O(CH$_3$CH$_2$)$_2$ is allowed to react with the prerequisite amount of lithium tert-butoxide (LiOC(CH$_3$)$_2$) in tetrahydrofuran.

EXAMPLE 12

Polymerization

The procatalyst stock solution is prepared by charging a 10 oz. pop bottle with the appropriate amount of W(NPh)Cl$_2$(OC$_6$H$_3$—2,6—((CH$_3$)$_2$CH)$_2$ from Example 9, and DCPD. Stock solutions of the activator are prepared by charging a 10 oz. pop bottle with the appropriate amounts of (CH$_3$CH$_2$CH$_2$CH$_3$)$_3$SnH and tributylphosphite (TBP). The following table indicate the amounts of materials used.

| Reaction Ratio | A-Component | B-Component |
|---|---|---|
| DCPD:W:(CH$_3$CH$_2$CH$_2$CH$_2$)$_3$SnH:TBP 2000:1:3:3 | DCPD:(CH$_3$CH$_2$CH$_2$CH$_2$)$_3$SnH:TBP 1000:3:3 100 mL:0.59 mL:0.60 mL | DCPD:W 1000:1 100 mL:0.51 g |

The final reaction ratio for mixed catalyst and activator components is DCPD:W:(CH$_3$CH$_2$CH$_2$CH$_2$)$_3$SnH:TBP=2000:1:3:3. An exothermic polymerization is observed for which the following parameters are pertinent. At 31° C., $t_{gel}$=62 seconds; $t_{100°\ C.}$=147 seconds; $t_{cure}$=166 seconds; $T_{max}$=200° C.; swell (%)=162.8; residual DCPD (%)=0.19. At 80° C., $t_{gel}$=18 seconds; $t_{100°\ C.}$=46 seconds; $t_{cure}$=64 seconds; $T_{max}$=223° C.; swell (%)=164.0; residual DCPD (%)=0.57.

EXAMPLE 13

Polymerization

The procatalyst stock solution is prepared by charging a 10 oz pop bottle with the appropriate amount of W(NPh)Cl$_2$(OC$_6$H$_3$—2,6((CH$_3$)$_2$CH)$_2$)$_2$ from Example 9 and DCPD. Stock solutions of the activator are prepared by charging a 10 oz pop bottle with the appropriate amount of (CH$_3$CH$_2$CH$_2$CH$_2$)$_3$SnH. The following table indicates the amounts of materials used.

| Reaction Ratio | A-Component | B-Component |
|---|---|---|
| DCPD:W:(CH$_3$CH$_2$CH$_2$CH$_2$)$_3$SnH 2000:1:3 | DCPD:(CH$_3$CH$_2$CH$_2$CH$_2$)$_3$SnH 1000:3 100 mL:0.59 mL | DCPD:W 1000:1 100 mL:0.51 g |

The final reaction ratio for mixed catalyst and activator components is from DCPD:W:(CH$_3$CH$_2$CH$_2$CH$_2$)$_3$SnH=2000:1:3. An exothermic polymerization is observed for which the following parameters are pertinent: At 31° C., $t_{gel}$=18 seconds; $t_{100°\ C.}$=63 seconds; $t_{cure}$=97 seconds; $T_{max}$=193° C.; swell (%)=178.5; residual DCPD (%)=0.12. At 80° C., $t_{gel}$=11 seconds; $t_{100°\ C.}$=60 seconds; $T_{max}$=218° C.; swell (%)=191.0; residual DCPD (%)=0.51.

EXAMPLE 14

Polymerization

The procatalyst stock solution is prepared by charging a 10 oz. pop bottle with the appropriate amount of W(NPh)Cl$_2$(OC$_6$H$_3$—2,6—Cl$_2$)$_2$ from Example 10, DCPD, and 2-methoxyethyl ether (DG). Stock solutions of the activator are prepared by charging a 10 oz. pop bottle with the appropriate amounts of (CH$_3$CH$_2$CH$_2$CH$_2$)$_3$SnH and tributylphosphite (TBP). The following table indicates the amounts of materials used.

| Reaction Ratio | A-Component | B-Component |
|---|---|---|
| DCPD:W:(CH$_3$CH$_2$CH$_2$CH$_2$)$_3$SnH:TBP 2000:1:2:3:2 | DCPD:(CH$_3$CH$_2$CH$_2$CH$_2$)$_3$SnH:TBP 1000:3:2 100 mL:0.59 mL:0.40 mL | DCPD:W:DG 1000:1:2 100 mL:0.491 g:0.21 mL |

-continued

| Reaction Ratio | A-Component | B-Component |
| --- | --- | --- |
| 4000:1:2:3:2 | 2000:3:2 | 2000:1:2 |
|  | 100 mL:0.30 mL:0.20 mL | 100 mL:0.246 g:0.11 mL |
| 8000:1:2:3:2 | 4000:3:2 | 4000:1:2 |
|  | 100 mL:0.15 mL:0.10 mL | 100 mL:0.122 g:0.05 mL |

The final reaction ratio for mixed catalyst and activator components is varied from $DCPD:W:DG:(CH_3CH_2CH_2CH_2)_3SnH:TBP = 2000:1:2:3:3$ to $2000:1:2:8:3$ (see Table 2).

TABLE 2

| $DCPD:W:DG:(CH_3CH_2CH_2CH_2)_3SnH:TBP$ | Initial Temp. (°C.) | $t_{gel}$ (sec) | $t_{100°C.}$ (sec) | $t_{180°C.}$ (sec) | $t_{Tmax}$ (sec) | $t_{max}$ (°C.) | Swell (%) | Residual Monomer (%) |
| --- | --- | --- | --- | --- | --- | --- | --- | --- |
| 2000:1:2:3:3 | 30 | 9 | 50 | 60 | 74 | 197 | 143.1 | 0.37 |
| 2000:1:2:3:3 | 80 | 11 | 17 | 23 | 37 | 207 | 159.4 | 0.45 |
| 4000:1:2:4:3 | 30 | 7 | 34 | 41 | 61 | 207 | 153.5 | 0.46 |
| 4000:1:2:4:3 | 80 | 5 | 14 | 19 | 32 | 202 | 191.7 | 0.62 |
| 8000:1:2:8:3 | 30 | 5 | 21 | 28 | 47 | 203 | 197.4 | 0.87 |
| 8000:1:2:8:3 | 80 | 5 | 16 | 22 | 38 | 202 | 215.6 | 0.88 |

$DCPD:W:DG:(CH_3CH_2CH_2CH_2)_3SnH:TBP = 2000:1:2:3:2$ to $8000:1:2:3:2$ (see Table 1).

TABLE 1

| $DCPD:W:DG:(CH_3CH_2CH_2CH_2)_3SnH:TBP$ | Initial Temp. (°C.) | $t_{gel}$ (sec) | $t_{100°C.}$ (sec) | $t_{180°C.}$ (sec) | $t_{Tmax}$ (sec) | $t_{max}$ (°C.) | Swell (%) | Residual Monomer (%) |
| --- | --- | --- | --- | --- | --- | --- | --- | --- |
| 2000:1:2:3:3 | 30 | 9 | 50 | 60 | 74 | 197 | 143.1 | 0.37 |
| 2000:1:2:3:3 | 80 | 11 | 17 | 23 | 37 | 207 | 159.4 | 0.45 |
| 4000:1:2:3:3 | 30 | 11 | 101 | 108 | 126 | 197 | 129.4 | 0.44 |
| 4000:1:2:3:3 | 80 | 11 | 20 | 27 | 49 | 209 | 149.5 | 0.77 |
| 8000:1:2:3:3 | 30 | 7 | 172 | 185 | 201 | 194 | 124.4 | 0.95 |
| 8000:1:2:3:3 | 80 | 9 | 24 | 29 | 44 | 207 | 149.3 | 2.14 |

EXAMPLE 15

Polymerizations

The procatalyst stock solution is prepared by charging a 10 oz pop bottle with the appropriate amount of $W(NPh)Cl_2(OC_6H_3-2,6-Cl_2)_2$ from Example 10, DCPD, and 2-methoxyethyl ether (DG). Stock solutions of the activator are prepared by charging a 10 oz pop bottle with the appropriate amounts of $(CH_3CH_2CH_2CH_2)_3SnH$ and TBP. The following table indicates the amounts of materials used.

| Reaction Ratio | A-Component | B-Component |
| --- | --- | --- |
| $DCPD:W:DG:(CH_3CH_2CH_2CH_2)_3SnH:TBP$ | $DCPD:DG:(CH_3CH_2CH_2CH_2)_3SnH:TBP$ | $DCPD:W:DG$ |
| 2000:1:2:3:3 | 1000:3:3 | 1000:1:2 |
|  | 100 mL:0.59 mL:0.60 mL | 100 mL:0.59 g:0.21 mL |
| 2000:1:2:4:3 | 1000:4:3 | 1000:1:2 |
|  | 100 mL:0.79 mL:0.60 mL | 100 mL:0.59 g:0.21 mL |
| 2000:1:2:8:3 | 1000:8:3 | 1000:1:2 |
|  | 100 mL:1.58 mL:0.60 mL | 100 mL:0.59 g:0.21 mL |

The final reaction ratio for mixed catalyst and activator components is varied from

EXAMPLE 16

Polymerizations

The stock solution of the procatalyst is prepared by mixing the appropriate amounts of $W(NPh)Cl_2(OC_6H_3-2,6-Cl_2)_2$ from Example 10, DCPD, and 2-methoxyethyl ether (DG) in a 10 oz pop bottle. Activator stock solutions are prepared by charging a 10 oz pop bottle with the appropriate amounts of $(CH_3CH_2CH_2CH_2)_3SnH$ and TBP. The following table indicates the amounts of materials used.

| Reaction Ratio | A-Component | B-Component |
| --- | --- | --- |
| $DCPD:W:DG:(CH_3CH_2CH_2CH_2)_3SnH:TBP$ | $DCPD:DG:(CH_3CH_2CH_2CH_2)_3SnH:TBP$ | $DCPD:W:DG$ |
| 2000:1:2:3:0 | 1000:3:0 | 1000:1:2 |
|  | 100 mL:0.59 mL:0.00 mL | 100 mL:0.491 g:0.21 mL |
| 2000:1:2:3:2 | 1000:3:2 | 1000:1:2 |
|  | 100 mL:0.59 mL:0.40 mL | 100 mL:0.491 g:0.21 mL |
| 2000:1:2:3:4 | 1000:3:4 | 1000:1:2 |
|  | 100 mL:0.59 mL:0.79 mL | 100 mL:0.491 g:0.21 mL |
| 2000:1:2:3:6 | 1000:3:6 | 1000:1:2 |
|  | 100 mL:0.59 mL:1.19 mL | 100 mL:0.491 g:0.21 mL |

The final reaction ratio for mixed catalyst and activator components was varied from DCPD:W:DG:(CH$_3$CH$_2$CH$_2$CH$_2$)$_3$SnH:TBP=2000:1-:2;3:0 to 2000:1;2:3:6 (see Table 3).

TABLE 3

| DCPD:W:DG:(CH$_3$CH$_2$CH$_2$CH$_2$)$_3$SnH:TBP | Initial Temp. (°C.) | $t_{gel}$ (sec) | $t_{100°\,C.}$ (sec) | $t_{180°\,C.}$ (sec) | $t_{Tmax}$ (sec) | $t_{max}$ (°C.) | Swell (%) | Residual Monomer (%) |
|---|---|---|---|---|---|---|---|---|
| 2000:1:2:3:0 | 30 | 1 | 9 | 16 | 29 | 201 | 158.7 | 0.35 |
| 2000:1:2:3:0 | 80 | 1 | 7 | 16 | 28 | 207 | 158.1 | 0.27 |
| 2000:1:2:3:2 | 30 | 4 | 37 | 45 | 61 | 201 | 162.8 | 0.35 |
| 2000:1:2:3:2 | 80 | 4 | 13 | 20 | 34 | 205 | 161.7 | 0.38 |
| 2000:1:2:3:4 | 30 | 9 | 63 | 70 | 86 | 196 | 154.6 | 0.39 |
| 2000:1:2:3:4 | 80 | 13 | 15 | 18 | 36 | 215 | 172.8 | 0.48 |
| 2000:1:2:3:6 | 30 | 10 | 84 | 92 | 105 | 191 | 155.0 | 0.48 |
| 2000:1:2:3:6 | 80 | 12 | 15 | 21 | 40 | 214 | 173.0 | 0.60 |

EXAMPLE 17

Polymerization

In this example dicyclopentadiene is polymerized with W(NC$_6$H$_3$—2,6-((CH$_3$)$_2$CH)$_2$(OC(CH$_3$)$_3$)$_2$Cl$_2$THf prepared in example 11 and tri-n-butyltin hydride ((CH$_3$CH$_2$CH$_2$CH$_2$)$_3$SnH) activator. A monomer solution containing the tungsten procatalyst is prepared as follows: 0.454 g (0.000×10−4 mol) is placed in a nitrogen sparged and capped vessel. To this is added 100 mL of DCPD and the mixture shaken to ensure full dissolution of the catalyst. The activator component is made similarly by the addition of a quantity of (CH$_3$CH$_2$CH$_2$CH$_2$)$_3$SnH) (0.59 mL, 2.193 mmol) to a sparged and capped pop bottle containing 100 mL of DCPD. The final reaction ratio achieved when the two components are mixed is then 2000:1;3 (DCPD:W:(CH$_3$CH$_2$CH$_2$CH$_2$)$_3$SnH).

Polymerization of DCPD occurs when 2.5 mL of the activator is syringed into a sparged test tube containing 2.5 mL of the catalyst stock solution, the contents mixed by vortex and the tube placed in an oil bath heated to 80° C. An exothermic polymerization is observed for which the following parameters are pertinent: At 80° C., $t_{gel}$=36 seconds; $t_{100°\,C.}$=235 seconds; $t_{cure}$=300 seconds; $T_{max}$=176° C.; swell (%)=118.1; residual DCPD (%)=3.03.

EXAMPLE 18

Polymerization

The procedure of Example 17 is followed except that the (CH$_3$CH$_2$CH$_2$CH$_2$)$_3$SnH solution is replaced by a mixture of (CH$_3$CH$_2$CH$_2$CH$_2$)$_3$SnH in DCPD containing three equivalents of tributylphosphite (TBP) per tin i.e., 0.59 mL (4.387 mmol) (CH$_3$CH$_2$CH$_2$CH$_2$)$_3$SnH and 0.60 mL TBP in 100 mL DCPD. Thus, the final reaction ratio of DCPD:W:(CH$_3$CH$_2$CH$_2$CH$_2$)$_3$SnH:TBP is 2000:1:3:3. An exothermic polymerization is observed for which the following parameters are pertinent: At 80° C., $T_{gel}$=30 seconds; $t_{100°\,C}$=128 seconds; $t_{cure}$=178 seconds; $T_{max}$=197° C.; swell (%)=122.3; residual DCPD (%)=4.18.

EXAMPLE 19

Polymerization

The procedure of Example 17 is followed except that the (CH$_3$CH$_2$CH$_2$CH$_2$)$_3$SnH solution is replaced by a mixture of (CH$_3$CH$_2$)$_2$AlCl("Al") in DCPD, i.e., 1.22 mL of a 1.8 M toluene solution of diethylaluminum chloride in 100 mL DCPD. Thus, the final reaction ratio of DCPD:W:Al is 2000:1:3. An exothermic polymerization is observed for which the following parameters are pertinent: At 30° C., $t_{gel}$=17 seconds; $t_{100°\,C.}$=39 seconds; $t_{180°\,C.}$=42 seconds; $t_{cure}$=57 seconds; $T_{max}$=205° C.; swell (%)=127.3; residual DCPD (%)=0.10. At 80° C., $t_{gel}$=13 seconds; $t_{100°\,C.}$=23 seconds; $t_{180°\,C.}$=27 seconds; $T_{cure}$=43 seconds; $T_{max}$=216° C.; swell (%)=124.4; residual DCPD (%)=0.35.

EXAMPLE 20

Polymerization

The procedure of Example 19 is followed except that (CH$_3$CH$_2$)$_2$AlCl("Al") solution is replaced by a mixture of Al in DCPD containing three equivalents of tributylphosphite (TBP) per aluminum, i.e., 1.22 mL of a 1.8 M toluene solution of diethylaluminum chloride and 0.60 mL TBP in 100 mL DCPD. Thus, the final reaction ratio of DCPD:W:Al:TBP is 2000:1:3:3. an Exothermic polymerization is observed for which the following parameters re pertinent: At 80° C., $t_{gel}$=30 seconds; $t_{100°\,C.}$=91 seconds; $t_{180°\,C.}$=104 seconds; $T_{cure}$=114 seconds; $T_{max}$=206° C.; swell (%)=117.5; residual DCPD (%)=1.64.

EXAMPLE 21

Polymerization

The procedure of Example 17 is followed except that the (CH$_3$CH$_2$CH$_2$CH$_2$)$_3$SnH solution is replaced by a mixture of triethylaluminum ((CH$_3$CH$_2$)$_3$Al)("Al") in DCPD, i.e., 1.16 mL of 1.9 M Al (in toluene) in 100 mL DCPD. Thus, the final reaction ratio of DCPD:W:Al is 2000:1:3. An exothermic polymerization is observed for which the following parameters are pertinent: at 80° C., $t_{gel}$=49 seconds; $t_{100°\,C.}$=138 seconds; $t_{180°\,C.}$=168 seconds; $t_{cure}$=180 seconds; $T_{max}$=229° C.; swell (%)=18.6; residual DCPD (%)=3.52.

EXAMPLE 22

Polymerization

The procedure of Example 17 is followed except that the (CH$_3$CH$_2$CH$_2$CH$_2$)$_3$SnH solution is replaced by a mixture of diethylzinc (Zn) in DCPD, i.e. 2.00 mL of 1.1 M diethylzinc (in toluene) in 100 mL DCPD. Thus, the final reaction ratio of DCPD:W:Zn is 2000:1:3. An exothermic polymerization is observed for which the following parameters are pertinent: at 80° C., $t_{gel}$=36 seconds; $t_{100°\,C.}$=70 seconds; $t_{180°\,C}$=75 seconds; $T_{cure}$=90 seconds; $T_{max}$=226° C.; swell (%)=118.4; residual DCPD (%)=1.17.

EXAMPLE 23

Preparation of Tungsten Procatalyst

The compound W(NC$_3$H$_3$—2,6—((CH$_3$)$_2$CH)$_2$)OCCH$_3$(CF$_3$)$_2$)$_2$Cl$_2$.THF is prepared in a manner similar to the method recited in Examples 1 and 2.

W(NPh)Cl4O(CH3CH2)2 is allowed to react with the prerequisite amount of lithium hexafluoro-tert-butoxide (LiOCCH3(CF3)2) in tetrahydrofuran.

EXAMPLE 24

Polymerization

In this example dicyclopentadiene is polymerized with the W(C6H2—2,6—((CH3)2CH)2-)(OCCH3(CF3)2)2Cl2.THF prepared in Example 23 and tri-n-butyltin hydride ((CH3CH2CH2CH2)3SnH) activator. A monomer solution containing the tungsten procatalyst is prepared as follows: 0.612 g (0.071×10−4 mol) is placed in a nitrogen sparged and capped vessel. To this is added 100 mL of DCPD and the mixture shaken to ensure full dissolution of the catalyst. The activator component is made similarly by the addition of a quantity of (CH3CH2CH2CH2)3SnH (0.59 mL, 2.193 mmol) to a sparged and capped pop bottle containing 100 mL of DCPD. The final reaction ratio achieved when the two components are mixed is then 2000:1:3 (DCPD:W:(CH3CH2CH2CH2)3SnH).

Polymerization of DCPD occurs when 2.5 mL of the activator is syringed into a sparged test tube containing 2.5 mL of the catalyst stock solution, the contents mixed by vortex and the tube placed in an oil bath heated to 80° C. An exothermic polymerization is observed for which the following parameters are pertinent: At 80° C., $t_{gel}=32$ seconds; $t_{100°}$ $c=64$ seconds; $t_{180°}$ $c=73$ seconds; $t_{cure}=91$ seconds; $T_{max}=218°$ C.; swell (%)=143.2; residual DCPD (%)=0.24.

EXAMPLE 25

Polymerization

The procedure of Example 24 is followed except that the (CH3CH2CH2CH2)3SnH ("Sn") solution is replaced by a mixture of Sn in DCPD containing three equivalents of tributylphosphite (TBP) per Sn, i.e., 0.59 mL (4.387 mmol) Sn and 0.60 mL TBP in 100 mL DCPD. Thus, the final reaction ratio of DCPD:W:Sn:TBP is 2000:1:3:3. An exothermic polymerization is observed for which the following parameters are pertinent: At 80° C., $t_{gel}=67$ seconds; $t_{100°}$ $c=197$ seconds; $t_{180°}$ $c=205$ seconds; $t_{cure}=221$ seconds; $T_{max}=230°$ C.; swell(%)=153.5; residual DCPD (%)=0.45.

EXAMPLE 26

Polymerization

The procedure of Example 24 is followed except that the (CH3CH2CH2CH2)3SnH solution is replaced by a mixture of (CH3CH2)2AlCl ("Al") in DCPD, i.e., 1.22 mL of a 1.8 M toluene solution of diethylaluminum chloride in 100 mL DCPD. Thus, the final reaction ratio of DCPD:W:Al is 2000:1:3. An exothermic polymerization is observed for which the following parameters are pertinent: At 30° C., $t_{gel}=50$ seconds; $t_{100°}$ $c=127$ seconds; $t_{180°}$ $c=137$ seconds; $t_{cure}=150$ seconds; $T_{max}=199°$ C.; swell (%)=118.0; residual DCPD (%)=0.40. At 80° C., $t_{gel}=16$ seconds; $t_{100°}$ $c=33$ seconds; $T_{180°}$ $c=39$ seconds; $t_{cure}=52$ seconds; $T_{max}=211°$ C.; swell(%)=135.2; residual DCPD(%)=0.25.

EXAMPLE 27

Polymerization

The procedure of Example 26 is followed except that the (CH3CH2)2AlCl ("Al") solution is replaced by a mixture of Al in DCPD containing three equivalents of tributylphosphite (TBP) per aluminum, i.e. 1.22 mL of a 1.8 M toluene solution of diethylaluminum chloride and 0.60 mL TBP in 100 mL DCPD. Thus, the final reaction ratio of DCPD:W:Al:TBP is 2000:1:3:3. An exothermic polymerization is observed for which the following parameters are pertinent: At 80° C., $t_{gel}=47$ seconds; $t_{100°}$ $c=113$ seconds; $t_{180°}$ $c=118$ seconds; $t_{cure}=131$ seconds; $T_{max}=241°$ C.; swell(%)=114.9; residual DCPD(%)=0.23.

EXAMPLE 28

Polymerization

The procedure of Example 24 is followed except that (CH3CH2CH2CH2)3SnH solution is replaced by a mixture of diethylzinc ("Zn") in DCPD, (in toluene) in 100 mL DCPD.

Thus, the final reaction ratio of DCPD:W:Zn is 2000:1:3. An exothermic polymerization is observed for which the following parameters are pertinent: At 80° C., $t_{gel}=33$ seconds; $t_{100°}$ $c=48$ seconds; $t_{180°}$ $c=51$ seconds; $t_{cure}=68$ seconds; $T_{max}=226°$ C.; swell (%)=321.0; residual DCPD (%)=0.14.

EXAMPLE 29

Polymerization

In this example, the effect of rate modification by addition of the rate modifier pyridine is determined with the catalyst of Example 2 (i.e., W(NPh)(OC(CH3)3)4) and the diethylaluminum chloride ("Al") activator (1.8 M in toluene) in DCPD in a 10 oz. pop bottle. The procatalyst solution is made up to 1000:1(DCPD:W) by dissolving 0.412 g of W(NPh)(OCCH3)3)4 in 100 mL of DCPD. The activator solution is prepared by adding Al (1.22 mL) to 50 mL of DCPD containing 0.18 mL pyridine (py). One pyridine per Al is employed in this formulation. The overall reaction stoichiometry achieved upon mixing the two components is 2000:1:3:3 (DCPD:W:Al:py). The pertinent information for the DCPD polymerization by W(NPh)(OC(CH3)3)4/Al.py is shown by the following parameters. At 30° C., $t_{gel}=5$ seconds; $t_{100°}$ $c=96$ seconds; $t_{cure}=140$ seconds; $T_{max}=199°$ C.; swell (%)=164.7; residual DCPD (%)=0.85. At 80° C., $t_{gel}=3$ seconds; $t_{100°}$ $c=19$ seconds; $t_{cure}=31$ seconds; $T_{max}=197°$ C.; swell (%)=196.7; residual DCPD (%)=0.57.

I claim:

1. A catalyst composition for the preparation of a polymer of at least one strained ring non-conjugated polycyclic cycloolefin monomer which comprises a) a tungsten-imido compound having the formula

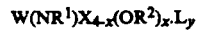

wherein x is 0, 1, 2, 3 or 4; y is 0 or 1; $R^1$ and $R^2$ are selected from alkyl, phenyl, phenyl-substituted phenyl, phenylalkyl and halogen-substituted derivatives of alkyl, phenyl, phenyl-substituted phenyl and phenyl alkyl groups; X is Br or Cl; and L is a donor ligand; said alkyl groups contain 1 to 8 carbon atoms; said phenyl-substituted phenyl groups contain 12 to 18 carbon atoms; and said phenylalkyl groups contain 7 to 20 carbon atoms; and b) at least one a activator selected from organometals, organometal hydrides and alkylsilanes.

2. The catalyst composition of claim 1 wherein the activator is selected from trialkylaluminums, dialkylaluminum halides, alkylaluminum dihalides, dialkyl(alkoxy)aluminums, alkyl(alkoxy)aluminum halides, dialkylzincs, diarylzincs, tetraalkyltins, trialkyltin hydrides, dialkyltin dihydrides, and triaryltin hydrides.

3. The catalyst composition of claim 1 wherein the donor ligand is selected from diethyl ether, ethylene glycol dimethyl ether, triethylene glycol dimethyl ether, 2-methoxyethyl ether, tetraethylene glycol dimethyl ether, tetrahydrofuran, acetonitrile, benzonitrile, pyridine, pyrazine and quinuclidine.

4. The catalyst composition of claim 1 further comprising at least one Lewis base stabilizer compound.

5. The catalyst composition of claim 4 wherein the stabilizer is selected from diethyl ether, ethylene glycol dimethyl ether, 2-methoxyethyl ether, triethylene glycol dimethyl ether, tetraethylene glycol dimethyl ether, benzonitrile, acetonitrile, tetrahydrofuran, monophenols, bisphenols, polyphenols and the butylated reaction product of p-cresol and dicyclopentadiene and mixtures thereof.

6. The catalyst composition of claim 1 further comprising at least one rate moderator selected from pyridine, pyrazine, tributylphosphite, triethylphosphine, tributylphosphine, tricyclohexylphosphine, triphenylphosphine, methyldiphenylphosphine, dimethylphenylphosphine, triethylphosphite, triisopropylphosphite, ethyldiphenylphosphonite, triphenylphosphite, triisopropylphosphine, trimethylphosphite, tri-tert-butylphosphine, diethylphenylphosphonite, and tribenzylphosphine.

7. The catalyst composition of claim 2 wherein the activator is tri-n-butyltin hydride.

8. The catalyst composition of claim 2 wherein the activator is trioctyltin hydride.

9. The catalyst composition of claim 1 wherein the tungsten-imido compound has the formula

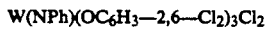
W(NPh)(OC$_6$H$_3$—2,6—Cl$_2$)$_3$Cl$_2$

10. The catalyst composition of claim 1 wherein the tungsten-imido compound has the formula

W(NPh)(OC(CH$_3$)$_3$)$_4$

11. A polymerization feed composition comprising
a) at least one metathesis polymerizable cycloolefin;
b) a tungsten-imido compound having the formula

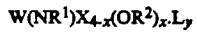
W(NR$^1$)X$_{4-x}$(OR$^2$)$_x$L$_y$ wherein x is 0, 1, 2, 3, or 4; y is 0 or 1; R$^1$ and R$^2$ are selected from alkyl, phenyl, phenyl-substituted phenyl, phenylalkyl and halogen-substituted derivatives of alkyl, phenyl, phenyl-substituted phenyl and phenylalkyl groups; X is Br or Cl; and L is a donor ligand; said alkyl groups contain 1 to 8 carbon atoms; said phenyl-substituted phenyl groups contain 12 to 18 carbon atoms; and said phenylalkyl groups contain 7 to 20 carbon atoms; and
c) at least one activator selected from organometals, organometal hydrides and alkylsilanes.

12. The polymerization feed composition of claim 11 wherein the activator is selected from trialkylaluminums, dialkylaluminum halides, alkylaluminum dihalides, dialkyl(alkoxy)aluminums, alkyl(alkoxy)aluminum halides, dialkylzines, diarylzincs, tetraalkyltins, trialkyltin hydrides, dialkyltin dihydrides, and triaryltin hydrides.

13. The feed composition of claim 11 further comprising at least one Lewis base stabilizer compound.

14. The feed composition of claim 11 further comprising at least one rate moderator selected from pyridine, pyrazine, tributylphosphite, triethylphosphine, tributylphosphine, tricyclohexylphosphine, triphenylphosphine, methyldiphenylphosphine, dimethylphenylphosphine, triethylphosphite, triisopropylphosphite, ethyldiphenylphosphonite, triphenylphosphine, triisopropylphosphine, trimethylphosphite, tri-tert-butylphosphine, diethylphenylphosphonite, and tribenzylphosphine.

15. The feed composition of claim 11 wherein the donor ligand is selected from diethyl ether, ethylene glycol dimethyl ether, triethylene glycol dimethyl ether, 2-methoxyethyl ether, tetraethylene glycol dimethyl ether, tetrahydrofuran, acetonitrile, benzonitrile, pyridine, pyrazine and quinuclidine.

16. The feed composition of claim 11 wherein the metathesis polymerizable cycloolefin is selected from dicyclopentadiene, trimers of cyclopentadiene, higher order cyclopentadiene oligomers, norbornene, norbornadiene, 4-alkylidene norbornenes, dimethanohexahydronaphthalene, dimethanooctahydronaphthalene, and alkyl-substituted derivatives of said cycloolefins and mixtures thereof.

17. The feed composition of claim 11 wherein the cycloolefin to tungsten-imido compound ratio is from about 500:1 to about 15,000:1 and the ratio of tungsten-imido compound to activator is from about 1:1 to about 1:8 on a molar basis.

18. In a process for preparing mold polymeric articles comprising charging to a mold a liquid reaction mass comprising at least one metathesis polymerizable cycloolefin and a catalyst composition comprising a metathesis polymerization tungsten compound and at least one activator and polymerizing the cycloolefin in the mold, the improvement of using a catalyst composition comprising
a) a tungsten-imido compound having the formula

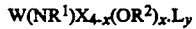
W(NR$^1$)X$_{4-x}$(OR$^2$)$_x$L$_y$ where x is 0, 1, 2, 3 or 4; y is 0 or 1; R$^1$ and R$^2$ are selected from alkyl, phenyl, phenyl-substituted phenyl, phenylalkyl and halogen-substituted derivatives of alkyl, phenyl, phenyl-substituted phenyl, and phenylalkyl groups; X is Br or Cl; and L is a donor ligand; said alkyl groups contain 1 to 8 carbon atoms; said phenyl-substituted phenyl groups contain 12 to 18 carbon atoms; and said phenylalkyl groups contain 7 to 20 carbon atoms; and
b) at least one activator selected from organometals, organometal hydrides and alkylsilanes.

19. The process of claim 18 wherein the activator is selected from trialkylaluminums, dialkylaluminum halides, alkylaluminum dihalides, dialkyl(alkoxy)aluminums, alkyl(alkoxy)aluminum halides, dialkylzines, diarylzincs, tetraalkyltins, trialkyltin hydrides, dialkyltin dihydrides, and triaryltin hydrides.

20. The process of claim 18 wherein the catalyst composition further comprises at least one Lewis base stabilizer compound.

21. The process of claim 18 wherein the catalyst composition further comprises at least one rate moderator selected from pyridine, pyrazine, tributylphosphite, triethylphosphine, tributylphosphine, tricyclohexylphosphine, triphenylphosphine, methyldiphenylphosphine, dimethylphenylphosphine, triethylphosphite, triisopropylphosphite, ethyldiphenylphosphonite, triphenylphosphite, triisopropylphosphine, trimethylphosphite, tri-tert-butylphosphine, diethylphenylphosphonite, and tribenzylphosphine.

22. The process of claim 18 wherein the donor ligand is selected from diethyl ether, ethylene glycol dimethyl ether, triethylene glycol dimethyl ether, 2-methoxyethyl ether, tetraethylene glycol dimethyl ether, tetrahydrofuran, acetonitrile, benzonitrile, pyridine, pyrazine and quinuclidine.

23. The process of claim 18 wherein the cycloolefin to tungsten-imido compound ratio is from about 500:1 to about 155,000:1 and the ratio of tungsten-imido compound to activator is from about 1:1 to about 1:8 on a molar basis.

24. The process of claim 18 wherein the cycloolefin, tungsten-imido compound and the activator are charged to the mold via a two stream reaction injection molding technique wherein a first stream containing the tungsten-imide compound and a second stream containing the activator are combined in a mixhead and immediately injected into the mold and wherein the cycloolefin is contained in at least one of said streams.

* * * * *

UNITED STATES PATENT AND TRADEMARK OFFICE
CERTIFICATE OF CORRECTION

PATENT NO. : 5,194,534
DATED : March 16, 1993
INVENTOR(S) : Andrew Bell It is certified that error appears in the above-identified patent and that said Letters Patent is hereby corrected as shown below:

In the Claims, Col. 19, Claim 9, line 40, "$W(NPh)(OC_6H_3-2,6-Cl_2)_3Cl_2$" should read --$W(NPh)(OC_6H_3-2,6-Cl_2)_2Cl_2$--; and In the Claims, Col. 20, Claim 19, lines 59 and 60, "dialkylzines" should read --dialkylzincs--.

Signed and Sealed this

Sixteenth Day of November, 1993

Attest:

BRUCE LEHMAN

Attesting Officer          Commissioner of Patents and Trademarks